(12) United States Patent
Hwang et al.

(10) Patent No.: US 11,442,427 B2
(45) Date of Patent: Sep. 13, 2022

(54) MULTIAXIS MACHINING DEVICE AND COMPENSATION METHOD THEREOF

(71) Applicant: National Chung-Shan Institute of Science and Technology, Taoyuan (TW)

(72) Inventors: Yi-Yuh Hwang, Taipei (TW); Li-Chung Liu, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 497 days.

(21) Appl. No.: 16/726,915

(22) Filed: Dec. 25, 2019

(65) Prior Publication Data
US 2021/0200180 A1 Jul. 1, 2021

(51) Int. Cl.
| | | |
|---|---|---|
| *G05B 19/404* | (2006.01) | |
| *B23Q 23/00* | (2006.01) | |
| *G01B 11/02* | (2006.01) | |
| *G01B 11/00* | (2006.01) | |
| *G01B 11/24* | (2006.01) | |
| *G01B 11/30* | (2006.01) | |
| *B23Q 17/24* | (2006.01) | |

(Continued)

(52) U.S. Cl.
CPC ........ *G05B 19/404* (2013.01); *B23Q 11/0007* (2013.01); *B23Q 17/22* (2013.01); *B23Q 17/2428* (2013.01); *B23Q 23/00* (2013.01); *G01B 11/002* (2013.01); *G01B 11/02* (2013.01); *G01B 11/24* (2013.01); *G01B 11/30* (2013.01); *G05B 19/402* (2013.01); *B23Q 1/626* (2013.01)

(58) Field of Classification Search
CPC ..... G01B 11/002; G01B 11/02; G01B 11/026; G01B 11/03; G01B 11/14; G01B 11/16; G01B 11/24; G01B 11/2441; G01B 11/30; G01B 11/303; G01B 9/02094; G01B 9/02095; G01B 9/02096; B23Q 1/26; B23Q 23/00; B23Q 17/24; B23Q 17/2414; B23Q 17/2419; B23Q 17/2423; B23Q 17/2428; B23Q 17/2452; B23Q 17/2459; B23Q 17/2461; B23Q 17/2466; B23Q 17/2471; B23Q 17/2476; B23Q 17/248; B23Q 17/2485; B23Q 17/249; B23Q 17/2495

See application file for complete search history.

(56) References Cited

U.S. PATENT DOCUMENTS 6,642,506 B1 * 11/2003 Nahum .................. G01B 3/205
250/231.13
7,173,691 B2 * 2/2007 Murphy ............. B23Q 17/2495
356/138

(Continued)

FOREIGN PATENT DOCUMENTS

| CN | 105415096 B | * 8/2017 |
|---|---|---|
| CN | 108775869 A | * 11/2018 |

(Continued)

*Primary Examiner* — Gordon J Stock, Jr.
(74) *Attorney, Agent, or Firm* — Winston Hsu

(57) ABSTRACT

The present invention provides a planar three-dimensional displacement sensor for a multiaxis machining device. With the measurement of the (planar) three-dimensional displacement sensor in the multiaxis machining device, the multiaxis machining device and a multiaxis machining compensation method are able to eliminate various deformation effects effectively.

16 Claims, 6 Drawing Sheets

(51) Int. Cl.
    *B23Q 17/22*     (2006.01)
    *B23Q 11/00*     (2006.01)
    *G05B 19/402*     (2006.01)
    *B23Q 1/62*     (2006.01)

(56) References Cited

U.S. PATENT DOCUMENTS

| | | | | |
|---|---|---|---|---|
| 7,295,324 | B2* | 11/2007 | Jones | G01B 11/002 356/498 |
| 7,715,016 | B2* | 5/2010 | Hwang | G01B 11/002 356/498 |
| 8,144,339 | B2* | 3/2012 | Hwang | G01B 11/14 356/498 |
| 10,189,133 | B2* | 1/2019 | Hwang | G01B 11/002 |
| 10,295,337 | B2* | 5/2019 | Matsumiya | G01B 11/303 |
| 10,571,259 | B2* | 2/2020 | Jywe | G01B 11/27 |
| 10,809,169 | B2* | 10/2020 | Ma | G01N 3/32 |
| 2012/0111088 | A1* | 5/2012 | Murashige | G01M 9/062 73/1.15 |
| 2015/0253129 | A1* | 9/2015 | Ohnishi | G01B 11/2531 348/87 |
| 2018/0079040 | A1* | 3/2018 | Ueda | B23Q 3/15536 |

FOREIGN PATENT DOCUMENTS

| | | | | | |
|---|---|---|---|---|---|
| CN | 109489592 | A | * | 3/2019 | |
| CN | 110220483 | A | * | 9/2019 | |
| CN | 112388389 | A | * | 2/2021 | B23Q 17/00 |
| JP | 2005069837 | A | * | 3/2005 | |
| JP | 2008-268000 | A | | 11/2008 | |
| JP | 2015-169510 | A | | 9/2015 | |
| JP | 2018179958 | A | * | 11/2018 | B23B 23/04 |
| WO | WO-2022059616 | A1 | * | 3/2022 | |

* cited by examiner

MULTIAXIS MACHINING DEVICE AND COMPENSATION METHOD THEREOF

BACKGROUND OF THE INVENTION

1. Field of the Invention

The present invention relates to a multiaxis machining device and a compensation method, and more particularly, to a multiaxis machining device and a compensation method using bright spot(s) to correct errors.

2. Description of the Prior Art

The machining performance of a machine tool has dynamic accuracy and machining performance repeatability attributes. The machining performance repeatability means that the machining quality of the first workpiece is consistent with the machining quality of the last one. Machining conditions (for example, machine temperature distribution, thermal deformation, stress deformation, abrasion, and so on) or working environment (for example, ambient temperature, cooling conditions, humidity changes, and so on) of the first workpiece may dramatically differ from those of the last workpiece. Regardless of the number of workpieces and the machining time, the machining quality must be maintained from the first workpiece to the last workpiece to ensure the machining performance repeatability.

Nevertheless, excessive errors, which can hardly be compensated, are accumulated due to effects of machine thermal deformation, stress deformation, and abrasion deformation. To solve thermal deformation of a machine tool, thermal deformation control technology is developed especially for Computer Numerical Control (CNC) system. For example, the temperature change of a machine tool is measured. Besides, real-time thermal deformation of the machine tool is calculated by means of software built in the machine tool to serve as thermal compensation correction displacement. The sampling range of the heat source of machine tool and the ambient temperature is however quite limited when the software is developed. If the heating characteristics of a motor in the machine tool or the ambient temperature change, there would be calculation errors from the software, which reduces accuracy and machining stability.

SUMMARY OF THE INVENTION

To obviate or at least alleviate the problems encountered in the prior art, it is an objective of the present invention to provide a (planar) three-dimensional displacement sensor for a multiaxis machining device. With the measurement of the (planar) three-dimensional displacement sensor in the multiaxis machining device, the multiaxis machining device and a multiaxis machining compensation method are able to eliminate various deformation effects effectively.

For the foregoing, an embodiment of the present invention provides a three-dimensional displacement sensor. The three-dimensional displacement sensor includes a secure element, a first displacement sensing component, a second displacement sensing component, a third displacement sensing component, and a signal processor. The secure element is a hollowed shell and has a first outer wall, a second outer wall, a third outer wall, a fourth outer wall and a fifth outer wall. Each of the first outer wall, the second outer wall, the third outer wall, the fourth outer wall and the fifth outer wall has a hole. The first outer wall and the third outer wall face an x-axis of the secure element. The second outer wall and the fourth outer wall face a y-axis of the secure element. The fifth outer wall faces a z-axis of the secure element. The x-axis, the y-axis and the z-axis are used to constitute a three-dimensional coordinate system. The first displacement sensing component includes a first coherent light source and a first light source sensor, which are arranged in pairs on the first outer wall and the third outer wall. The first light source sensor measures bright spots generated by irradiation from the first coherent light source to an object under test and outputs a first image signal to a signal processor. The second displacement sensing component includes a second coherent light source and a second light source sensor, which are arranged in pairs on the second outer wall and the fourth outer wall. The second light source sensor measures bright spots generated by irradiation from the second coherent light source to the object under test and outputs a second image signal to the signal processor The third displacement sensing component is a laser confocal displacement sensor, a color confocal displacement sensor, a white light interference displacement sensor, or a triangulation laser displacement sensor. The third displacement sensing component is disposed on the fifth outer wall. The third displacement sensing component measures displacement of the object under test in the z-axis and outputs a digital signal to the signal processor. The signal processor is configured to process the first image signal, the second image signal and the digital signal and output a three-dimensional displacement coordinate.

In the three-dimensional displacement sensor of the present invention, the first coherent light source and the first light source sensor measure the object under test through the hole of the first outer wall and the hole of the holes of the third outer wall respectively. The second coherent light source and the second light source sensor measure the object under test through the hole of the second outer wall and the hole of the fourth outer wall respectively. The third displacement sensing component measures the object under test through the hole of the fifth outer wall.

In the three-dimensional displacement sensor of the present invention, the first displacement sensing component, the second displacement sensing component, and the third displacement sensing component measure a same surface of the object under test.

An embodiment of the present invention provides a multiaxis machining device. The multiaxis machining device includes a reference positioning base, a translation platform support, a first slider, a second slider, a first three-dimensional displacement sensor, a second three-dimensional displacement sensor, and a third three-dimensional displacement sensor. The reference positioning base is made of low thermal expansion material. The translation platform support is disposed beneath the reference positioning base without contacting the reference positioning base. The translation platform support includes a support body, an x-axis slide shaft, a y-axis slide shaft, and a z-axis slide shaft. The x-axis slide shaft is coupled to the y-axis slide shaft. The x-axis slide shaft is slidable along the y-axis slide shaft. The y-axis slide shaft and the z-axis slide shaft are confined in the support body. A bright spot ruler made of low thermal expansion material is arranged on one side of the z-axis slide shaft. The first slider is coupled to the x-axis slide shaft. The first slider is slidable along the x-axis slide shaft. The second slider is coupled to the z-axis slide shaft. The second slider is slidable along the z-axis slide shaft. The first three-dimensional displacement sensor is fixed to the first slider and is configured to measure the reference positioning base. The second three-dimensional displacement sensor is fixed to the second slider and is configured to measure the bright spot ruler. The third three-dimensional displacement sensor is fixed to the bright spot ruler and is configured to measure the reference positioning base.

An embodiment of the present invention provides a multiaxis machining device. The multiaxis machining device includes a reference positioning base, a translation platform support, a first slider module, a second slider module, a first three-dimensional displacement sensor, a second three-dimensional displacement sensor, and a third three-dimensional displacement sensor. The reference positioning base is made of low thermal expansion material. The translation platform support is disposed beneath the reference positioning base without contacting the reference positioning base. The translation platform support includes a support body, an x-axis slide shaft, a y-axis slide shaft, and a z-axis slide shaft. The x-axis slide shaft is coupled to the y-axis slide shaft. The x-axis slide shaft is slidable along the y-axis slide shaft. The y-axis slide shaft and the z-axis slide shaft are confined in the support body. A bright spot ruler made of low thermal expansion material is arranged on one side of the z-axis slide shaft. The first slider module includes a first slider, a z-axis micro-displacement platform, and a first jig tool. The first slider is coupled to the x-axis slide shaft. The first slider is slidable along the x-axis slide shaft. The z-axis micro-displacement platform is disposed on the first slider. The first jig tool is disposed on the z-axis micro-displacement platform. A second slider module includes a second slider, an x-axis-versus-y-axis micro-displacement platform, and a second jig tool. The second slider is coupled to the z-axis slide shaft. The second slider is slidable along the z-axis slide shaft. The x-axis-versus-y-axis micro-displacement platform is disposed on the second slider. The second jig tool is disposed on the x-axis-versus-y-axis micro-displacement platform. The first three-dimensional displacement sensor is fixed to the first slider and is configured to measure the reference positioning base. The second three-dimensional displacement sensor is fixed to the second slider and is configured to measure the bright spot ruler. The third three-dimensional displacement sensor is fixed to the bright spot ruler and is configured to measure the reference positioning base.

In the multiaxis machining device of the present invention, the first slider module further includes a first link unit. One end of the first link unit is coupled to the first jig tool. Another end of the first link unit is coupled to the first three-dimensional displacement sensor, such that the first three-dimensional displacement sensor is configured to measure the reference positioning base. The second slider module further includes a second link unit. One end of the second link unit is coupled to the second jig tool. Another end of the second link unit is coupled to the second three-dimensional displacement sensor, such that the second three-dimensional displacement sensor is configured to measure the bright spot ruler.

In the multiaxis machining device of the present invention, the x-axis-versus-y-axis micro-displacement platform includes an x-axis micro-displacement platform and a y-axis micro-displacement platform. The x-axis micro-displacement platform is disposed on the second slider. The y-axis micro-displacement platform is disposed on the x-axis micro-displacement platform. The second jig tool is disposed on the y-axis micro-displacement platform.

In the multiaxis machining device of the present invention, the multiaxis machining device further includes a driving system to electrically drive the x-axis slide shaft, the first slider, the second slider, the z-axis micro-displacement platform and the x-axis-versus-y-axis micro-displacement platform.

In the multiaxis machining device of the present invention, the low thermal expansion material may be granite, constant steel, or zero expansion ceramic.

An embodiment of the present invention provides a multiaxis machining compensation method. The multiaxis machining compensation method includes providing a multiaxis machining device; fixing the first three-dimensional displacement sensor to the first slider, measuring the reference positioning base, and obtaining x-axis displacement, y-axis displacement, and z-axis displacement of the first slider with respect to the reference positioning base to serve as a first three-dimensional displacement; fixing the second three-dimensional displacement sensor to the second slider, measuring the bright spot ruler, and obtaining x-axis displacement, y-axis displacement, and z-axis displacement of the second slider with respect to the bright spot ruler to serve as a second three-dimensional displacement; fixing the third three-dimensional displacement sensor to the bright spot ruler, measuring the reference positioning base, and obtaining x-axis displacement, y-axis displacement, and z-axis displacement of the bright spot ruler with respect to the reference positioning base to serve as a third three-dimensional displacement; and providing a machining compensation processor. The machining compensation processor calculates the first three-dimensional displacement, the second three-dimensional displacement, and the third three-dimensional displacement to obtain a machining processing displacement and a compensation displacement. The machining compensation processor adjusts positions of the first slider and the second slider and performs feedback control of the multiaxis machining device in machining and compensation according to the machining processing displacement and the compensation displacement.

An embodiment of the present invention provides a multiaxis machining compensation method. The multiaxis machining compensation method includes providing a multiaxis machining device; fixing the first three-dimensional displacement sensor to the first jig tool, measuring the reference positioning base, and obtaining x-axis displacement, y-axis displacement, and z-axis displacement of the first jig tool with respect to the reference positioning base to serve as a first three-dimensional displacement; fixing the second three-dimensional displacement sensor to the second jig tool, measuring the bright spot ruler, and obtaining x-axis displacement, y-axis displacement, and z-axis displacement of the second jig tool with respect to the bright spot ruler to serve as a second three-dimensional displacement; fixing the third three-dimensional displacement sensor to the bright spot ruler, measuring the reference positioning base, and obtaining x-axis displacement, y-axis displacement, and z-axis displacement of the bright spot ruler with respect to the reference positioning base to serve as a third three-dimensional displacement; adding the second three-dimensional displacement and the third three-dimensional displacement to obtain a second slider relative to a fourth three-dimensional displacement of the second jig tool with respect to the reference positioning base; providing a machining compensation processor; obtaining a machining processing displacement by means of the x-axis displacement of the first three-dimensional displacement, the y-axis displacement of the first three-dimensional displacement, and the z-axis displacement of the fourth three-dimensional displacement; obtaining a compensation displacement by means of the z-axis displacement of the first three-dimensional displacement, the x-axis displacement of the fourth three-dimensional displacement, and the y-axis displacement of the fourth three-dimensional displacement; and adjusting positions of the first jig tool and the second jig tool and performs feedback control of the multiaxis machining device in machining and compensation according to the machining processing displacement and the compensation displacement.

Other objectives, advantages and features of the present invention will be apparent from the following description referring to the attached drawings.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
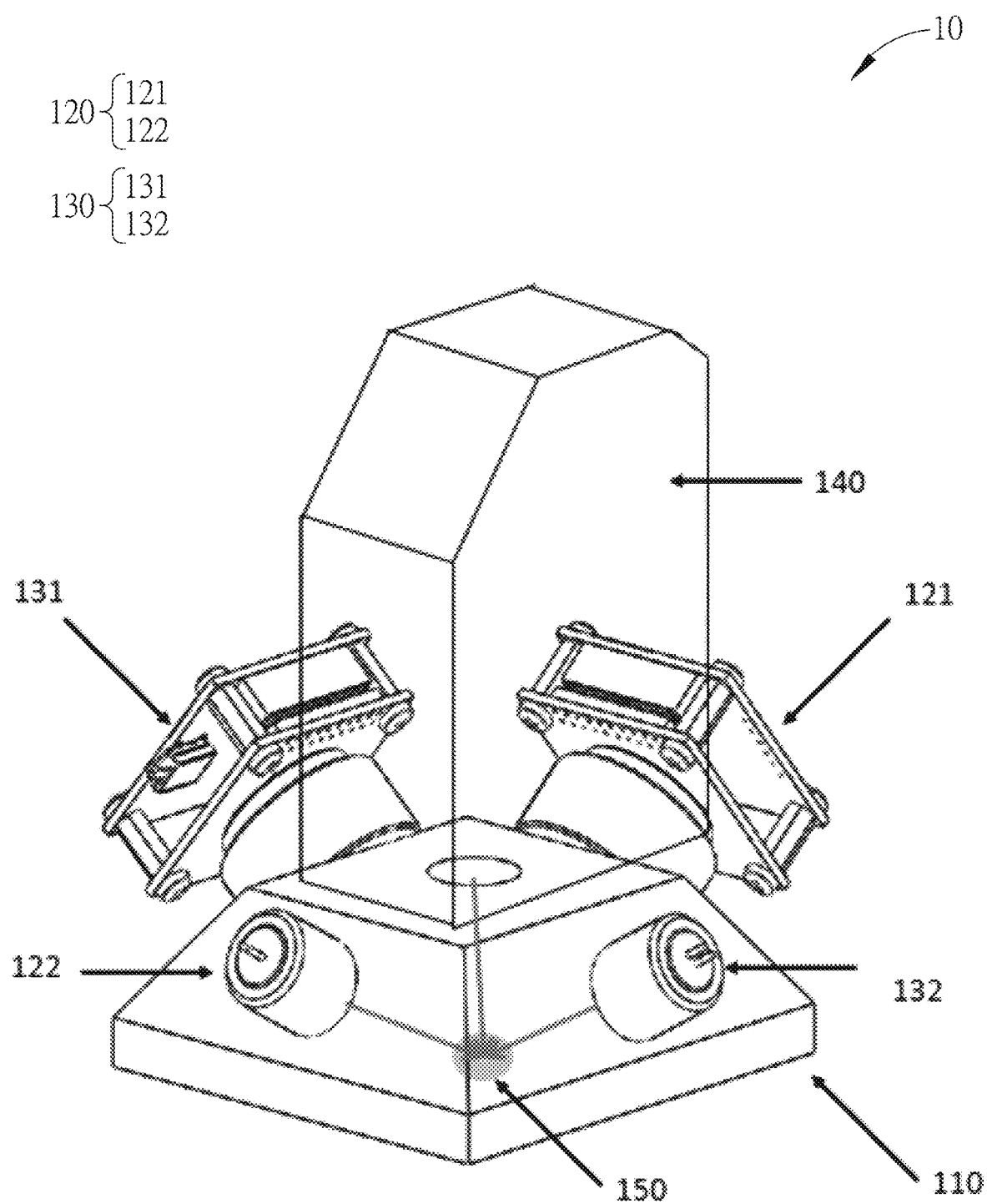
FIG. 1 is a schematic diagram of a three-dimensional displacement sensor according to an example of the present invention.

In the following description, for purposes of explanation, numerous specific details are set forth in order to provide a thorough understanding of one or more aspects of the present invention. It may be evident, however, to one skilled in the art that one or more aspects of the present invention may be practiced with a lesser degree of these specific details.

The present invention discloses a (planar) three-dimensional displacement sensor to quickly perform three-dimensional real-time positioning between two object planes, thereby minimizing the inconvenience of a conventional three-dimensional bright spot displacement sensor. In a conventional three-dimensional bright spot displacement sensor, bright spot (also referred to as optical speckle) images are measured on the side of an object under test to obtain the displacement of the object under test in the z-axis (vertical) direction. If bright spot images of solely a top surface of the object under test are measured, merely the displacement vector of the object under test in the x-axis and y-axis directions can be obtained. It is impossible to get displacement information in the z-axis (vertical) direction of the object under test. Therefore, a displacement sensor of the z-axis direction, which is able to make accurately measurement, is added to an xy-plane (bright spot image) displacement sensor (also referred to as an xy-plane dual bright spot image reader). The displacement sensor of the z-axis direction (also referred to as z-axis displacement sensor) may be a laser confocal displacement sensor, a color confocal displacement sensor, a white light interference displacement sensor, a triangulation laser displacement sensor, and so on. In some embodiments, two (bright spot image) displacement sensors are disposed for measurements in the x-axis and y-axis directions respectively. A laser confocal displacement sensor, a color confocal displacement sensor, a white light interference displacement sensor, or a triangulation laser displacement sensor may be disposed for measurements in the z-axis direction. Laser beams from the three displacement sensors hit the same point on a surface of the object under test. For measurement accuracy, it is required for the laser beam of the z-axis displacement sensor to be focused. The diameter of the focal point (also referred to as focal spot) of the z-axis displacement sensor is less than 10 micrometers; and the diameter of the laser point of the x-axis or y-axis displacement sensor is substantially in a range of 500 to 1000 micrometers. Because the area of a scattered bright spot of the focused laser of the z-axis displacement sensor is quite small, positioning accuracy of the bright spot image in the x-axis or y-axis direction would hardly be affected. Moreover, the x-axis (bright spot image) displacement sensor is perpendicular to the y-axis (bright spot image) displacement sensor. Scattered bright spots of the bright spot image in the x-axis or y-axis direction hardly interfere with each other since the intensity of a zero-degree scattered bright spot is much greater than that of a 90-degree scattered bright spot. As a result, so the three-dimensional displacement sensor of the x-axis, y-axis, and z-axis directions can measure the three-dimensional displacement of the same point on a surface of the object under test.

The x-axis and y-axis (bright spot image) displacement sensors of the three-dimensional displacement sensor of the present invention captures two bright spot images at the same point on a surface of the object under test but from mutually perpendicular angles. Each positioning point respectively records x-axis direction array intensity distribution [In, Im]x-axis-xi, yj of the bright spot image, y-axis direction array intensity distribution [In, Im]y-axis-xi, yj of the bright spot image, and three-dimensional coordinates (Xi, Yj, Zk) of the center point of the bright spot image. Bright spot images corresponding to the x-axis or y-axis direction may employ Scale Invariant Feature Transform (SIFT) matching/positioning technique, Sum and Difference (SAD) sub-pixel matching/positioning technique, Sum of Square Difference (SSD), and Normalized Cross Correlation (NCC), or other approaches. In the use of SIFT matching/positioning technique, positioning accuracy is in a range of 0.01 to 0.1 micrometers, and positioning repetition rate is in a range of 1 to 100 hertz. In the use of SAD sub-pixel matching/positioning technique, positioning accuracy is in a range of 0.05 to 0.5 micrometers, positioning repetition rate is in a range of 1 to 10 kilohertz. In terms of the z-axis displacement sensor, positioning accuracy is in a range of 0.001 to 0.1 micrometers, positioning repetition rate may exceed 10 kilohertz. If an xy-plane (bright spot image) displacement sensor using sub-pixel matching/positioning techniques such as SAD, SSD, NCC is integrated with the z-axis (height) displacement sensor, a three-dimensional displacement sensor of high positioning accuracy (less than 0.1 micrometers) and high positioning repetition rate (more than 10 kilohertz) may be obtained. Besides, three-dimensional real-time displacement positioning may be performed not only on a static target but also on moving objects. In the following embodiments of the present invention, both the first displacement sensing component and the second displacement sensing component may be implemented as a (bright spot image) displacement sensor respectively; the first displacement sensing component and the second displacement sensing component may be combined into an xy-plane (bright spot image) displacement sensor.

The (planar) three-dimensional displacement sensor includes an xy-plane (bright spot image) displacement sensor and the z-axis (height) displacement sensor. The xy-plane (bright spot image) displacement sensor utilizes undistorted bright spot image(s) of a surface texture of the object under test for positioning. In the use of the xy-plane (undistorted bright spot) (image) displacement sensor, a two-dimensional bright spot image coordinate database for the xy plane may be recorded first. The x-axis displacement sensor and the y-axis displacement sensor record their own bright spot image coordinate database respectively. Whenever a (coordinate) bright spot image is captured, a two-dimensional laser interferometer is used to record the two-dimensional positioning coordinate of the (coordinate) bright spot image synchronously to develop the two-dimensional bright spot image coordinate database for the xy plane.

When the two-dimensional bright spot image coordinate database for the xy plane is building, the height of the center of each (coordinate) bright spot image in the z-axis direction is recorded. Together with the x-axis and y-axis coordinates in the two-dimensional bright spot image coordinate database for the xy plane, the center of each (coordinate) bright spot image is recorded with a three-dimensional absolute positioning coordinate (x, y, z) i, j. Moreover, the two-dimensional bright spot image coordinate database for the xy plane and a three-dimensional contour (coordinate) database of the object under test are completed synchronously.

When the (planar) three-dimensional displacement sensor is used later, the height in the z-axis direction is first adjusted to an operation dynamic range. Subsequently, two initial bright spot images corresponding to the x-axis and y-axis displacement sensors are captured in the xy plane. Each of the initial bright spot images is compared with the two-dimensional bright spot image coordinate database corresponding to the x-axis and y-axis displacement sensors, such that the x-axis and y-axis coordinates of an initial positioning point are obtained. With the three-dimensional contour (coordinate) database, the z-axis (height) coordinate of the initial positioning point may be obtained, and the height in the z-axis direction is adjusted to reach the z-axis (height) coordinate. In this manner, three-dimensional calibration of the initial positioning point is completed.

After the positioning of the three-dimensional coordinates $[x(0),y(0),z(0)]$ of the initial positioning point is completed, the x-axis, y-axis, and z-axis displacement sensors may make comparisons at a positioning repetition rate greater than 10 kilohertz so as to accurately locate the three-dimensional relative displacement trajectory $[x(t),y(t),z(t)]$ of the object under test with respect to the (planar) three-dimensional displacement sensor.

Please refer to FIG. 1, which is a schematic diagram of a three-dimensional displacement sensor 10 according to an example of the present invention. As shown in FIG. 1, the three-dimensional displacement sensor of the present invention includes a secure element 110, a first displacement sensing component 120, a second displacement sensing component 130, a third displacement sensing component 140, and a signal processor. The secure element 110 is a hollowed shell surrounded by a first outer wall, a second outer wall, a third outer wall, a fourth outer wall and a fifth outer wall. Each of the first outer wall, the second outer wall, the third outer wall, the fourth outer wall and the fifth outer wall has a hole. The first outer wall and the third outer wall face an x-axis of the secure element 110; in other words, the first outer wall and the third outer wall are perpendicular or normal to the x-axis direction of the secure element 110. The second outer wall and the fourth outer wall face a y-axis of the secure element 110; the fifth outer wall faces a z-axis of the secure element 110. The x-axis, the y-axis and the z-axis are used to constitute a three-dimensional coordinate system. The first displacement sensing component 120 includes a first coherent light source 122 and a first light source sensor 121, which are arranged in pairs on the first outer wall and the third outer wall. The first light source sensor 121 is configured to measure bright spot(s), which are generated when the first coherent light source 122 irradiates the object 150 under test, and output a first image signal to a signal processor. The second displacement sensing component 130 includes a second coherent light source 132 and a second light source sensor 131, which are arranged in pairs on the second outer wall and the fourth outer wall. The second light source sensor 131 is configured to measure bright spot(s), which are generated when the second coherent light source 132 irradiates the object 150 under test, and output a second image signal to the signal processor. The third displacement sensing component 140, which may be a laser confocal displacement sensor, a color confocal displacement sensor, a white light interference displacement sensor, or a triangulation laser displacement sensor, is disposed on the fifth outer wall. The third displacement sensing component 140 is configured to measure the displacement of the object 150 under test in the z-axis direction and output a digital signal to the signal processor. The signal processor is configured to process the first image signal, the second image signal and the digital signal and output a three-dimensional (displacement) coordinate.

In some embodiments, the first coherent light source 122 and the first light source sensor 121 measure the object 150 under test through the hole of the first outer wall and the hole of the holes of the third outer wall respectively. The second coherent light source 132 and the second light source sensor 131 measure the object 150 under test through the hole of the second outer wall and the hole of the fourth outer wall respectively. The third displacement sensing component 140 measures the object 150 under test through the hole of the fifth outer wall. The first displacement sensing component 120, the second displacement sensing component 130 and the third displacement sensing component 140 can measure points on the same surface of the object 150 under test.

The three-dimensional displacement sensor of the present invention is distinct from any of the conventional displacement sensors such as a conventional laser confocal displacement sensor, a conventional color confocal displacement sensor, a conventional white light interference displacement sensor, or a conventional triangulation laser displacement sensor currently used in the industry. The laser beam of the conventional displacement sensors for z-axis direction measurement must be focused to meet positioning accuracy requirements, and hence the diameter of the bright spot is small (for example, less than 10 micrometers). Additionally, in order to construct three-dimensional contour of the object 150 under test, an x-axis-versus-y-axis scanning optical system or an x-axis-versus-y-axis servo displacement platform is required to synchronously execute plane scanning and positioning of x-axis and y-axis direction when the height in the z-axis direction is measured. Currently, the conventional displacement sensor(s) can only perform three-dimensional contour scanning of the object 150 under test, but fail to accomplish three-dimensional relative displacement measurement between the object 150 under test and the conventional displacement sensor(s).

Figure 2:
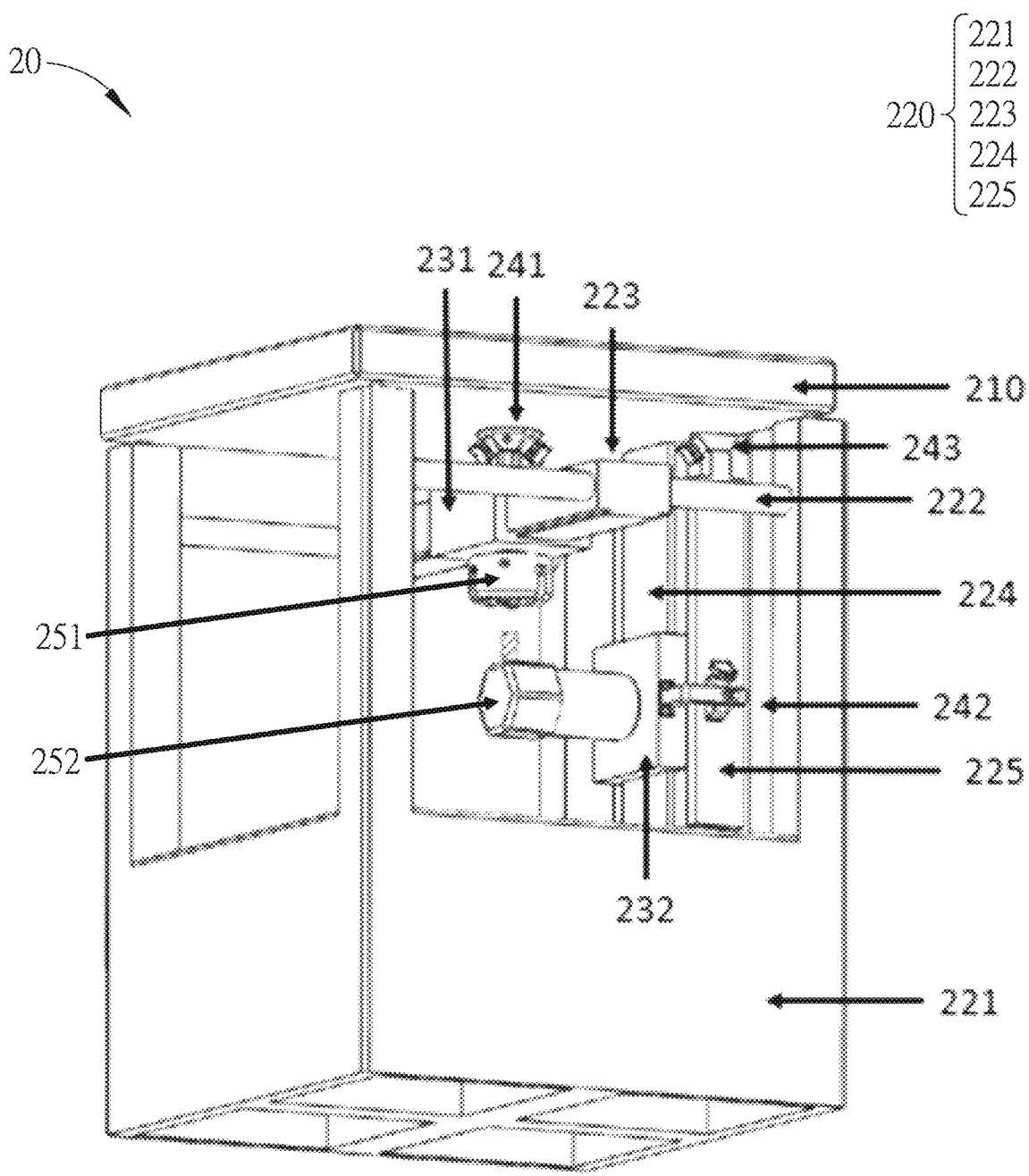
FIG. 2 is a schematic diagram of a multiaxis machining device according to a first example of the present invention.

Please refer to FIG. 2, which is a schematic diagram of a multiaxis machining device 20 according to a first example of the present invention. As shown in FIG. 2, the multiaxis machining device 20 of the present invention includes a reference positioning base 210, a translation platform support 220, a first slider 231, a second slider 232, a first three-dimensional displacement sensor 241, a second three-dimensional displacement sensor 242, and a third three-dimensional displacement sensor 243. The reference positioning base 210 is made of low thermal expansion material. The translation platform support 220 is disposed beneath the reference positioning base 210. To reduce friction deformation effects between the reference positioning base 210 and the translation platform support 220 as much as possible, the translation platform may provide multi points (at least three points) to hold up the reference positioning base 210. Moreover, the translation platform may be assembled or fixed between the reference positioning base 210 and the translation platform support 220 by single point. Preferably, a distance between the reference positioning base 210 and the translation platform support 220 is less than 20 centimeters to prevent the three-dimensional displacement sensor from failing to measure the reference positioning base 210. The translation platform support 220 includes a support body 221, an x-axis slide shaft 223, a y-axis slide shaft 222, and a z-axis slide shaft 224. There is a connection between the x-axis slide shaft 223 and the y-axis slide shaft 222. The x-axis slide shaft 223 may slide along the y-axis slide shaft 222; the y-axis slide shaft 222 and the z-axis slide shaft 224 are confined in and/or fixed to the support body 221. A bright spot ruler 225 made of low thermal expansion material is arranged on one side of the z-axis slide shaft 224. There is a connection between the first slider 231 and the x-axis slide shaft 223. The first slider 231 may slide along the x-axis slide shaft 223. There is a connection between the second slider 232 and the z-axis slide shaft 224. The second slider 232 may slide along the z-axis slide shaft 224. The first three-dimensional displacement sensor 241, which is fixed to the first slider 231, is configured to measure the reference positioning base 210. The second three-dimensional displacement sensor 242, which is fixed to the second slider 232, is configured to measure the bright spot ruler 225. The third three-dimensional displacement sensor 243, which is fixed to the bright spot ruler 225, is configured to measure the reference positioning base 210. Each of the first three-dimensional displacement sensor 241, the second three-dimensional displacement sensor 242, and the third three-dimensional displacement sensor 243 may be implemented as the aforementioned three-dimensional displacement sensor respectively.

Figure 3:
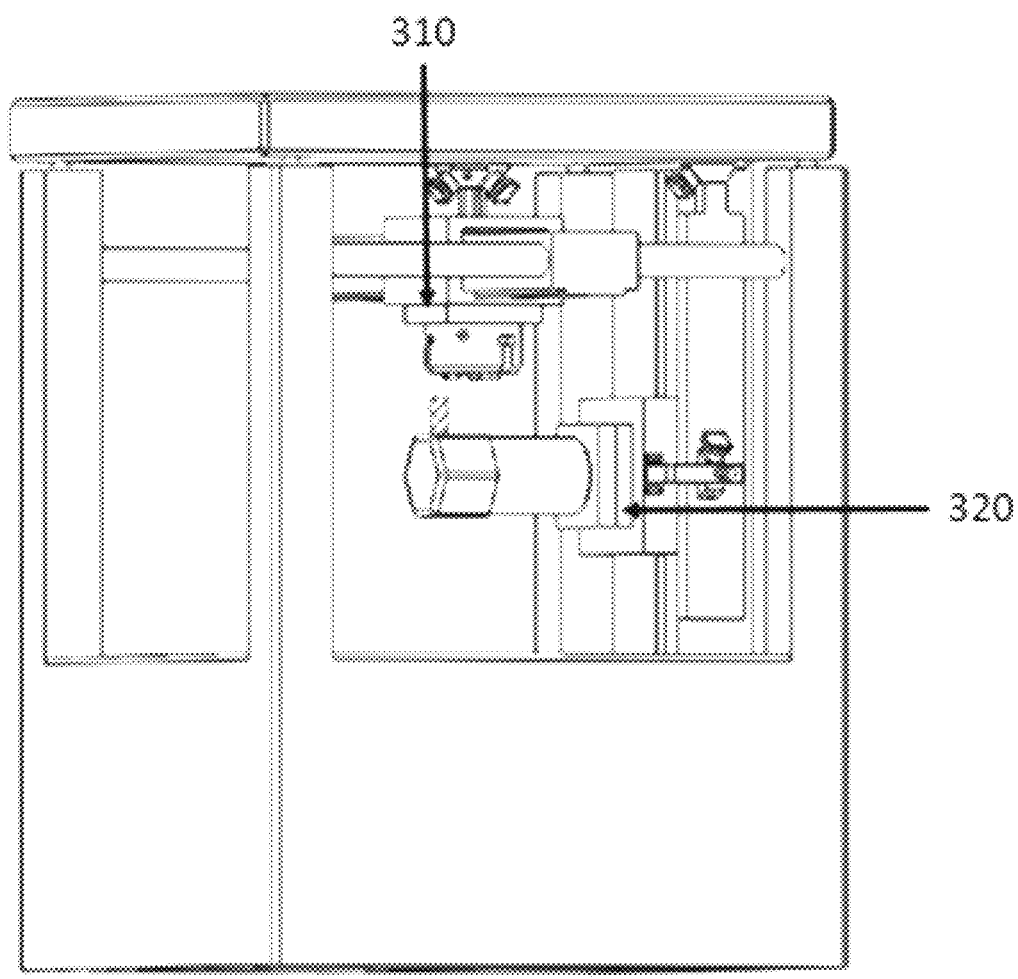
FIG. 3 is a schematic diagram of a multiaxis machining device according to a second example of the present invention.

Please refer to FIG. 3, which is a schematic diagram of a multiaxis machining device 30 according to a second example of the present invention. As shown in FIG. 3, another multiaxis machining device 30 is provided in the present invention. Different from the multiaxis machining device 20 shown in FIG. 2, the multiaxis machining device 30 of the present invention further includes an x-axis micro-displacement platform 3421, a y-axis micro-displacement platform 3422, and a z-axis micro-displacement platform 332. The z-axis micro-displacement platform 332 is disposed on the first slider 231. The x-axis micro-displacement platform 3421 or the y-axis micro-displacement platform 3422 is disposed on the second slider 232. That is to say, positions of the z-axis micro-displacement platform 332 and the x-axis micro-displacement platform 3421 are adjusted according to the compensation displacement.

The multiaxis machining device 30 may further include a driving system to electrically drive the x-axis slide shaft 223, the first slider 231, the second slider 232, the z-axis micro-displacement platform 332 and the x-axis micro-displacement platform 3421. In some embodiments, the low thermal expansion material may be granite, constant steel or zero expansion ceramic.

Figure 4:
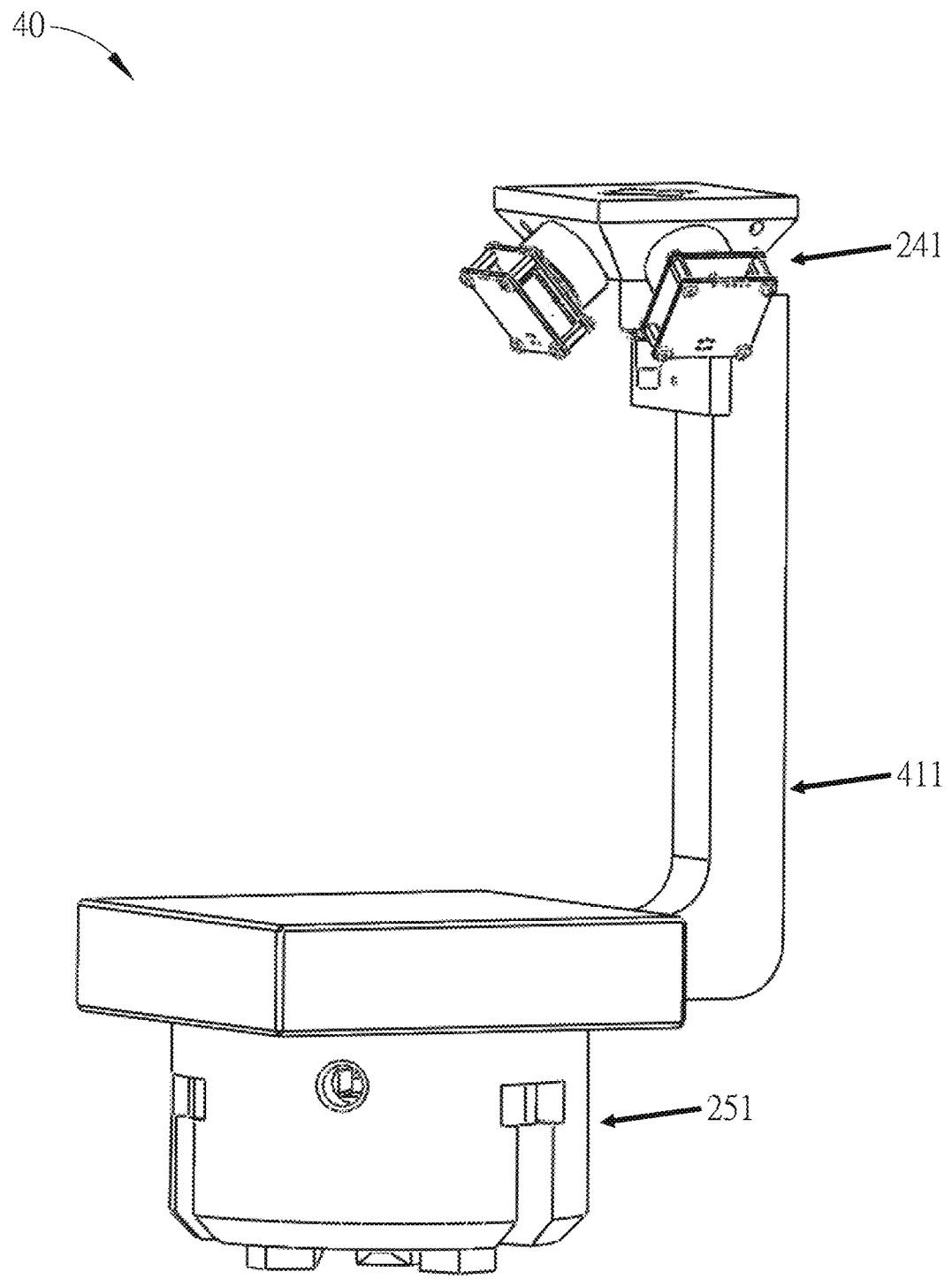
FIG. 4 is a schematic diagram of an object unit according to an example of the present invention.

Please refer to FIG. 4, which is a schematic diagram of an object unit 40 according to an example of the present invention. The object unit 40 may serve as a first slider module. The object unit 40 may include an object unit link 411 (also referred to as a first link unit). In the embodiment, one end of the object unit link 411 is coupled to the object unit holder 251 (also referred to as the first jig tool), while the other end of the object unit link 411 is coupled to the first (planar) three-dimensional displacement sensor 241. In this manner, the first (planar) three-dimensional displacement sensor 241 may be utilized to measure the reference positioning base 210. To be more specific, as shown in FIG. 4, the object unit link 411 of the object unit 40 is mounted on the side of the object unit holder 251. The first (planar) three-dimensional displacement sensor 241, which is disposed on the object unit slider (for instance, the first slider 231) in the multiaxis machining device 20 or the multiaxis machining device 30, is moved to the object unit link 411. The first (planar) three-dimensional displacement sensor 241 is configured to measure the three-dimensional displacement $(dx, dy, dz)_{the\ object\ unit}$ with respect to the (granite slab) reference positioning base 210 in real-time. The object unit link 411 may be made of low thermal expansion materials, such as constant steel, zero-expansion ceramics, and so on. Besides, the object unit link 411 is required to have sufficient rigidity. As long as the temperature of the object unit link 411 is properly controlled during operation, the deformation (amount) of the object unit link 411 may be much lower than system positioning accuracy. As a result, the object unit 40 may be accurately positioning with respect to the (granite slab) reference positioning base 210.

Figure 5:
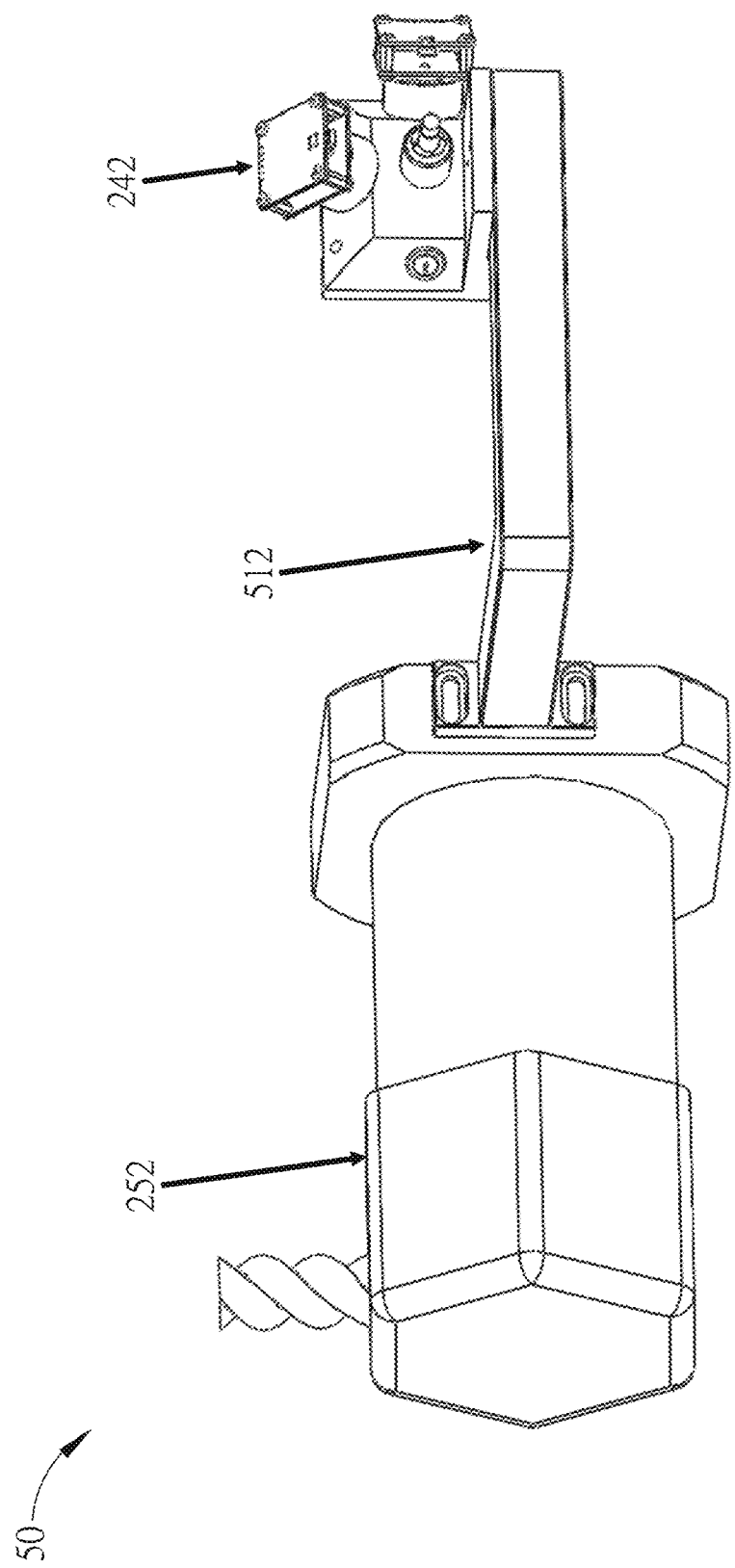
FIG. 5 is a schematic diagram of a tool unit according to an example of the present invention.

Please refer to FIG. 5, which is a schematic diagram of a tool unit 50 according to an example of the present invention. The tool unit 50 may serve as a second slider module. The tool unit 50 may include a tool unit link 512 (also referred to as a second link unit). In the embodiment, one end of the tool unit link 512 is coupled to the tool unit holder 252 (also referred to as the second jig tool), while the other end of the tool unit link 512 is coupled to the second (planar) three-dimensional displacement sensor 242. In this manner, the second (planar) three-dimensional displacement sensor 242 may be utilized to measure the bright spot ruler 225. To be more specific, as shown in FIG. 5, the tool unit link 512 of the tool unit 50 is mounted on the side of the tool unit holder 252. The second (planar) three-dimensional displacement sensor 242, which is disposed on the tool unit slider (for instance, the z-axis slide shaft or the second slider 232) in the multiaxis machining device 20 or the multiaxis machining device 30, is moved to the tool unit link 512. The second (planar) three-dimensional displacement sensor 242 is configured to measure the three-dimensional positioning coordinate $(dx, dy, dz)_{the\ bright\ spot\ ruler}$ of the tool unit 50 with respect to the bright spot ruler 225 in real-time, such that the three-dimensional displacement (dx', dy') of the tool unit 50 with respect to the (granite slab) reference positioning base 210 in real-time may be obtained. The tool unit link 512 may be made of low thermal expansion materials, such as constant steel, zero-expansion ceramics, and so on. Besides, the tool unit link 512 is required to have sufficient rigidity. As long as the temperature of the tool unit link 512 is properly controlled during operation, the deformation (amount) of the tool unit link 512 may be much lower than system positioning accuracy. As a result, the tool unit 50 may be accurately positioning with respect to the bright spot ruler 225.

Figure 6:
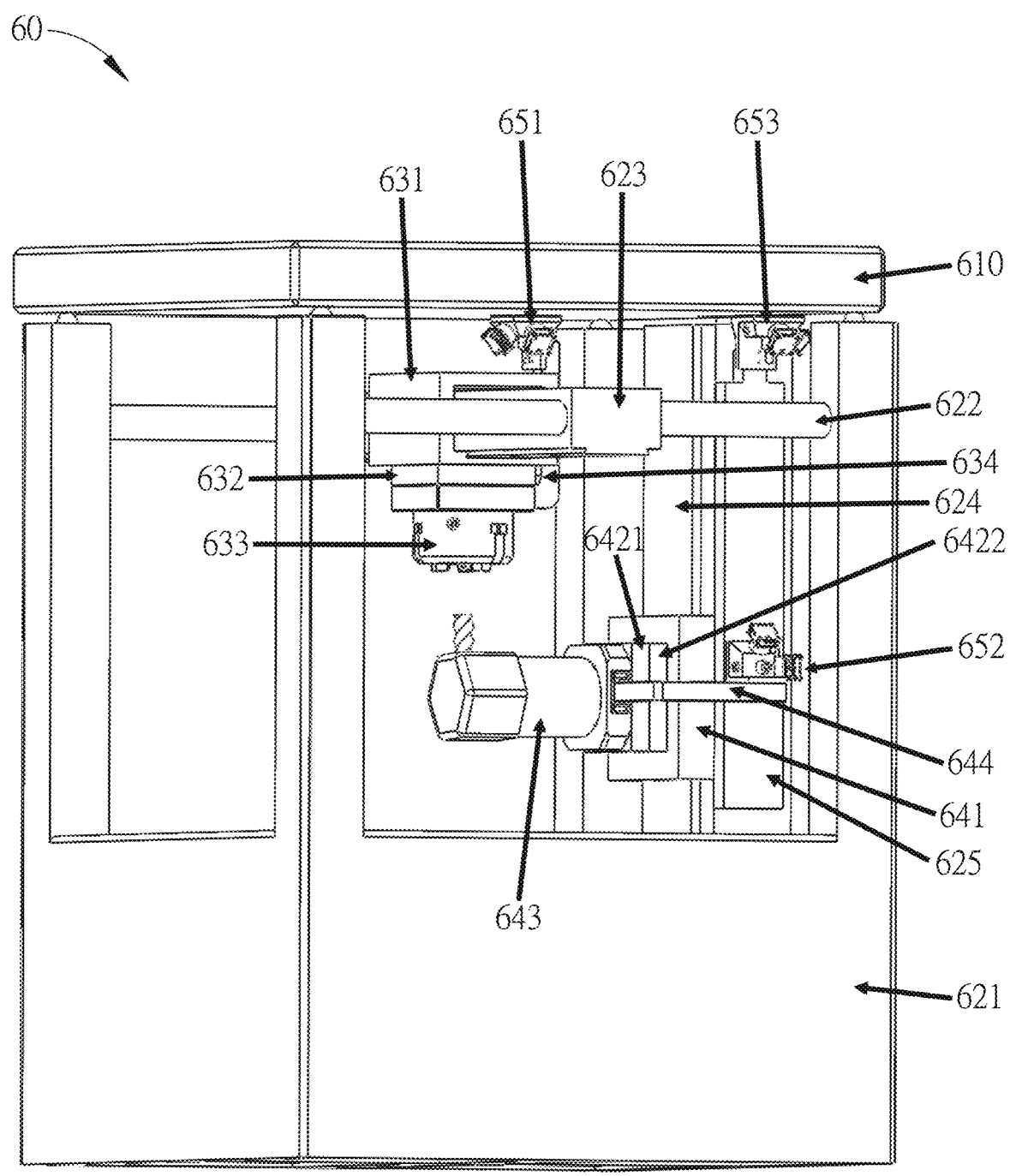
FIG. 6 is a schematic diagram of a multiaxis machining device according to a third example of the present invention.

Please refer to FIG. 6, which is a schematic diagram of a multiaxis machining device 60 according to a third example of the present invention. As shown in FIG. 6, the z-axis micro-displacement platform 632 is disposed between the object unit slider (for instance, the first slider 631) and the first jig tool 633 so as to compensate and correct the deformation amount $(dz)_{the\ object\ unit}$ of the object unit in real-time. The x-axis-versus-y-axis micro-displacement platform, which includes the x-axis micro-displacement platform 6421 and the y-axis micro-displacement platform 6422, is disposed between the tool unit slider (for instance, the second slider 641) and the second jig tool 643 so as to compensate and correct the deformation amount $(dx, dy)_{the\ tool\ unit}$ of the tool unit in real-time. Using x-axis micro-displacement platform 6421, the y-axis micro-displacement platform 6422, and the z-axis micro-displacement platform 632 to separately compensate the deformation (amount) of the machine body and the translation platform (for instance, the x-axis slide shaft 623, the y-axis slide shaft 622, and the z-axis slide shaft 624), the servo system may rarely be interfered. By feeding the displacement $(dx, dy)_{the\ object\ unit}$ of the object unit back into an x-axis-versus-y-axis servo system (for example, an x-axis servo system and a y-axis servo system), and feeding the displacement $(dz)_{the\ tool\ unit}$ of the tool unit back into a z-axis servo system, a conventional servo control may be performed. The multiaxis machining device 60 combines the aforementioned three-dimensional displacement platform architecture with three-dimensional micro-displacement platforms for multiaxis machining servo control system, which eliminates various deformation effects, without further adjustments to the servo control system.

Specifically, the multiaxis machining device 60 of the present invention includes a reference positioning base 610, a translation platform support 620, a first slider module, a second slider module, and a third three-dimensional displacement sensor 643. The reference positioning base 610 may be made of low thermal expansion material. The translation platform support 620 is disposed beneath the reference positioning base 610. The translation platform support 620 includes a support body 621, an x-axis slide shaft 623, a y-axis slide shaft 622, and a z-axis slide shaft 624. There is a connection between the x-axis slide shaft 623 and the y-axis slide shaft 622. The x-axis slide shaft 623 may slide along the y-axis slide shaft 622; the y-axis slide shaft 622 and the z-axis slide shaft 624 are confined in and/or fixed to the support body 621. A bright spot ruler 625 made of low thermal expansion material is arranged on one side of the z-axis slide shaft 624. The first slider module includes a first slider 631, the z-axis micro-displacement platform 632, a first jig tool 633, a first link 634, and a first three-dimensional displacement sensor 651. There is a connection between the first slider 631 and the x-axis slide shaft 623. The first slider 631 may slide along the x-axis slide shaft 623. The z-axis micro-displacement platform 632 is disposed on the first slider 631. The first jig tool 633 is disposed on the z-axis micro-displacement platform 632. The first link 634 is disposed on a side of the first jig tool 633. The first three-dimensional displacement sensor 651, which is fixed to the first link 634, is configured to measure the reference positioning base 610. The second slider module includes a second slider 641, the x-axis micro-displacement platform 6421, the y-axis micro-displacement platform 6422, a second jig tool 643, a second link 644, and a second three-dimensional displacement sensor 652. There is a connection between the second slider 641 and the z-axis slide shaft 624. The second slider 641 may slide along the z-axis slide shaft 624. The x-axis micro-displacement platform 6421 is disposed on the second slider 641. The y-axis micro-displacement platform 6422 is disposed on the x-axis micro-displacement platform 6421. The second jig tool 643 is disposed on the y-axis micro-displacement platform 6422. The second link 644 is disposed on a side of the second jig tool 643. The second three-dimensional displacement sensor 652, which is fixed to the second link 644, is configured to measure the bright spot ruler 625. The third three-dimensional displacement sensor 643, which is fixed to the bright spot ruler 625, is configured to measure the reference positioning base 610. Each of the first three-dimensional displacement sensor 651, the second three-dimensional displacement sensor 652, and the third three-dimensional displacement sensor 643 may be implemented as the aforementioned three-dimensional displacement sensor respectively.

An embodiment of the present invention further provides a multiaxis machining compensation method applied to the multiaxis machining device 20 according to the first example of the present invention. The multiaxis machining compensation method applied to the first embodiment may include steps as bellows. Provide the multiaxis machining device 20 according to the first example of the present invention. Fix the first three-dimensional displacement sensor 241 to the first slider 231. Measure the reference positioning base 210 to obtain an x-axis displacement $(dx_{the\ first\ slider\ with\ respect\ to\ the\ reference\ positioning\ base})$, a y-axis displacement $(dy_{the\ first\ slider\ with\ respect\ to\ the\ reference\ positioning\ base})$ and a z-axis displacement $(dz_{the\ first\ slider\ with\ respect\ to\ the\ reference\ positioning\ base})$ of the first slider 231 with respect to the reference positioning base 210 to constitute a first three-dimensional displacement $(dx, dy, dz)_{the\ first\ slider\ with\ respect\ to\ the\ reference\ positioning\ base}$. Fix the second three-dimensional displacement sensor 242 to the second slider 232. Measure the bright spot ruler 225 to obtain an x-axis displacement $(dx_{the\ second\ slider\ with\ respect\ to\ the\ bright\ spot\ ruler})$, a y-axis displacement $(dy_{the\ second\ slider\ with\ respect\ to\ the\ bright\ spot\ ruler})$ and a z-axis displacement $(dz_{the\ second\ slider\ with\ respect\ to\ the\ bright\ spot\ ruler})$ of the second slider 232 with respect to the bright spot ruler 225 to constitute a second three-dimensional displacement $(dx, dy, dz)_{the\ second\ slider\ with\ respect\ to\ the\ bright\ spot\ ruler}$. Fix the third three-dimensional displacement sensor 243 to the bright spot ruler 225. Measure the reference positioning base 210 to obtain an x-axis displacement $(dx_{the\ bright\ spot\ ruler\ with\ respect\ to\ the\ reference\ positioning\ base})$, a y-axis displacement $(dy_{the\ bright\ spot\ ruler\ with\ respect\ to\ the\ reference\ positioning\ base})$ and a z-axis displacement $(dz_{the\ bright\ spot\ ruler\ with\ respect\ to\ the\ reference\ positioning\ base})$ of the bright spot ruler 225 with respect to the reference positioning base 210 to constitute a third three-dimensional displacement $(dx, dy, dz)_{the\ bright\ spot\ ruler\ with\ respect\ to\ the\ reference\ positioning\ base}$. Add the second three-dimensional displacement and the third three-dimensional displacement to obtain a fourth three-dimensional displacement $(dx, dy, dz)_{the\ second\ slider\ with\ respect\ to\ the\ reference\ positioning\ base}$ of the second slider 232 with respect to the reference positioning base 210. Provide a (machining) compensation processor. Obtain a machining processing displacement ($dx_{the\ first\ slider\ with\ respect\ to\ the\ reference\ positioning\ base}$, $dy_{the\ first\ slider\ with\ respect\ to\ the\ reference\ positioning\ base}$, $dz_{the\ second\ slider\ with\ respect\ to\ the\ reference\ positioning\ base}$) by means of the x-axis displacement ($dx_{the\ first\ slider\ with\ respect\ to\ the\ reference\ positioning\ base}$) of the first three-dimensional displacement, the y-axis displacement ($dy_{the\ first\ slider\ with\ respect\ to\ the\ reference\ positioning\ base}$) of the first three-dimensional displacement, and the z-axis displacement ($dz_{the\ second\ slider\ with\ respect\ to\ the\ reference\ positioning\ base}$) of the fourth three-dimensional displacement. Obtain a compensation displacement ($dx_{the\ second\ slider\ with\ respect\ to\ the\ reference\ positioning\ base}$, $dy_{the\ second\ slider\ with\ respect\ to\ the\ reference\ positioning\ base}$, $dz_{the\ first\ slider\ with\ respect\ to\ the\ reference\ positioning\ base}$) by means of the z-axis displacement ($dz_{the\ first\ slider\ with\ respect\ to\ the\ reference\ positioning\ base}$) of the first three-dimensional displacement, the x-axis displacement ($dx_{the\ second\ slider\ with\ respect\ to\ the\ reference\ positioning\ base}$) of the fourth three-dimensional displacement, and the y-axis displacement ($dy_{the\ second\ slider\ with\ respect\ to\ the\ reference\ positioning\ base}$) of the fourth three-dimensional displacement. According to the machining processing displacement and the compensation displacement, the (machining) compensation processor then adjusts the (movement) positions of the first slider 231 and the second slider 232, and performs feedback control of the multiaxis machining device 20 in machining and compensation.

In addition, an embodiment of the present invention further provides a multiaxis machining compensation method in order to build a multiaxis machining device able to effectively eliminate various deformation effects. In the multiaxis machining compensation method, a two-dimensional bright spot image coordinate database {[In, Im]x-axis-xi, yj, [In, Im]y-axis-xi, yj} and a three-dimensional contour (coordinate) database (Xi, Yj, Zk) are firstly developed for a surface of a platform of low thermal expansion such as granite. The platform of low thermal expansion such as granite may then be mounted on the top of the multiaxis machining device to serve as a three-dimensional reference positioning base (for instance, the reference positioning base 210) of the multiaxis machining device.

An x-axis-versus-y-axis displacement platform (for instance, the x-axis slide shaft 223 and the y-axis slide shaft 222) is mounted beneath the (granite) platform (for instance, the reference positioning base 210). A three-dimensional displacement sensor (for instance, the first three-dimensional displacement sensor 241) is mounted above the x-axis-versus-y-axis (displacement) (platform) slider (for instance, the first slider 231), while an object unit holder 251 (also referred to as the first jig tool) is mounted beneath the x-axis-versus-y-axis (displacement) (platform) slider. Using the three-dimensional displacement sensor above the x-axis-versus-y-axis (displacement) (platform) slider, three-dimensional positioning coordinates of the x-axis-versus-y-axis (displacement) (platform) slider with respect to the (granite) platform may be measured in real-time.

The x-axis-versus-y-axis (displacement) (platform) slider may be made of low thermal expansion materials, such as constant steel, zero-expansion ceramics, and soon. Besides, the x-axis-versus-y-axis (displacement) (platform) slider is required to have sufficient rigidity. As long as the temperature of the x-axis-versus-y-axis (displacement) (platform) slider is properly controlled during operation, the deformation (amount) of the x-axis-versus-y-axis (displacement) (platform) slider may be much lower than system positioning accuracy. Therefore, the three-dimensional deformation (amount) between the three-dimensional displacement sensor (for instance, the first three-dimensional displacement sensor 241) above the (x-axis-versus-y-axis displacement platform) slider and the object unit holder 251 beneath the (x-axis-versus-y-axis displacement platform) slider may be much smaller than system positioning accuracy.

Therefore, three-dimensional displacement measurement of the three-dimensional displacement sensor (for instance, the first three-dimensional displacement sensor 241) above the x-axis-versus-y-axis (displacement) (platform) slider with respect to the (granite) platform is equivalent to three-dimensional displacement measurement of the object unit holder 251 (also referred to as the first jig tool) beneath the x-axis-versus-y-axis (displacement) (platform) slider. The displacement $(dx, dy)_{the\ x\text{-}axis\text{-}versus\text{-}y\text{-}axis\ slider\ with\ respect\ to\ the\ reference\ positioning\ base}$ in the xy plane is directly based on the (granite) platform, which is nondeformable and serves as a reference positioning base. Consequently, the displacement $(dx, dy)_{the\ x\text{-}axis\text{-}versus\text{-}y\text{-}axis\ slider\ with\ respect\ to\ the\ reference\ positioning\ base}$ is a total displacement derived from a thrust amount of x-axis-versus-y-axis servo motor and a total deformation amount of thermal deformation, stress deformation, abrasion deformation and such like of the machine body and the x-axis-versus-y-axis translation platform (for instance, the x-axis slide shaft 223 and the y-axis slide shaft 222). When the measurement of the displacement $(dx, dy)_{the\ x\text{-}axis\text{-}versus\text{-}y\text{-}axis\ slider\ with\ respect\ to\ the\ reference\ positioning\ base}$ is fed back into a servo positioning system in real-time, all the deformation of the machine body and the x-axis-versus-y-axis translation platform is correctly measured and fed back into the servo positioning system, thereby truly reflecting the displacement of the first jig tool (namely, it may be regarded as an equivalent position of the first jig tool) in the x-axis and y-axis directions. Without any machining in the z-axis direction on the slider above the x-axis-versus-y-axis translation platform, the z-axis displacement $(dz_{the\ x\text{-}axis\text{-}versus\text{-}y\text{-}axis\ slider\ with\ respect\ to\ the\ reference\ positioning\ base})$ measured by the three-dimensional displacement sensor in the z-axis direction is merely a total deformation amount of the machine body and the x-axis-versus-y-axis translation platform in the z-axis direction. The measurement of the (real-time) displacement $(dz_{the\ x\text{-}axis\text{-}versus\text{-}y\text{-}axis\ slider\ with\ respect\ to\ the\ reference\ positioning\ base})$ is required to be fed back into the z-axis servo motor for correction and compensation.

A one-dimensional bright spot image coordinate database [In, Im]z-axis-xi, yj and a three-dimensional contour (coordinate) database (Xi, Yj, Zk) are then developed for a surface of the bright spot ruler 225 for the z-axis direction. The (z-axis) bright spot ruler 225, which may be a long slab made of low thermal expansion material such as granite, is mount on the side of the z-axis translation platform (for instance, the z-axis slide shaft 224). The three-dimensional displacement sensor (for instance, the third three-dimensional displacement sensor 243), which is disposed above the (z-axis) bright spot ruler 225, is configured to measure a three-dimensional displacement $(dx, dy, dz)_{the\ bright\ spot\ ruler\ with\ respect\ to\ the\ reference\ positioning\ base}$ of the top of the bright spot ruler 225 with respect to the (granite) reference positioning base 210 in real-time. Another three-dimensional displacement sensor (for instance, the second three-dimensional displacement sensor 242) is mount on the side of the z-axis slider (for instance, the tool unit slider or the second slider 232) so as to measure another three-dimensional displacement (dx, dy, dz)$_{\text{the z-axis slider with respect to the bright spot ruler}}$ of the z-axis slider with respect to the (z-axis) bright spot ruler 225 in real-time. By summing the three-dimensional displacement (dx, dy, dz)$_{\text{the bright spot ruler with respect to the reference positioning base}}$ with respect to the (granite) reference positioning base 210 and the three-dimensional displacement (dx, dy, dz)$_{\text{the z-axis slider with respect to the bright spot ruler}}$ with respect to the (z-axis) bright spot ruler 225, a three-dimensional displacement (dx, dy, dz)$_{\text{the z-axis slider with respect to the reference positioning base}}$ of the tool unit slider with respect to the (granite) reference positioning base 210 may be obtained.

The (z-axis) bright spot ruler 225 is made of low thermal expansion materials such as constant steel, zero-expansion ceramics, zero-expansion glass, and so on. Besides, the (z-axis) bright spot ruler 225 is required to have sufficient rigidity. As long as the temperature of the (z-axis) bright spot ruler 225 is properly controlled during operation, the deformation (amount) of the (z-axis) bright spot ruler 225 may be much lower than system positioning accuracy. Similarly, the z-axis slider (for instance, the tool unit slider or the second slider 232) is made of low thermal expansion materials such as constant steel, zero-expansion ceramics, and so on. Besides, the z-axis slider is required to have sufficient rigidity. As long as the temperature of the z-axis slider is properly controlled during operation, the deformation (amount) of the z-axis slider may be much lower than system positioning accuracy. Consequently, the z-axis displacement (dz)$_{\text{the z-axis slider with respect to the reference positioning base}}$ of the second jig tool (namely, it may be regarded as an equivalent position of the second jig tool) with respect to the (granite) reference positioning base 210 is a total displacement derived from a thrust amount of z-axis servo motor and a total deformation amount of thermal deformation, stress deformation, abrasion deformation and such like of the machine body and the z-axis translation platform (for instance, the z-axis slide shaft 224). When the measurement of the displacement (dz)$_{\text{the z-axis slider with respect to the reference positioning base}}$ of the tool unit is fed back into the servo positioning system in real-time, all the deformation of the machine body and the z-axis translation platform in the z-axis direction is correctly measured and fed back into the servo positioning system, thereby truly reflecting the displacement of the second jig tool in the z-axis direction.

In addition, without any machining in the x-axis direction and the y-axis direction on the second jig tool, the (two-dimensional) deformation, which is the (actual) deformation (dx, dy)$_{\text{the z-axis slider with respect to the reference positioning base}}$ measured by the three-dimensional displacement sensor, is merely a total deformation amount of the machine body and the z-axis translation platform (for instance, the z-axis slide shaft 224) in the xy plane. The (real-time) measurement of the deformation (dx, dy)$_{\text{the z-axis slider with respect to the reference positioning base}}$ of the tool unit is required to be fed back into the x-axis-versus-y-axis servo motor for correction and compensation.

The multiaxis machining device 20 in the first example of the present invention encounters some difficulties. The (real-time) measurement (dz)$_{\text{the x-axis-versus-y-axis slider with respect to the reference positioning base}}$ of the x-axis-versus-y-axis slider with respect to the reference positioning base 210 must be compensated by the z-axis servo motor. Furthermore, the (real-time) measurement (dx, dy)$_{\text{the z-axis slider with respect to the reference positioning base}}$ of the z-axis slider with respect to the (granite) reference positioning base 210 must be compensated by the x-axis and y-axis servo motors. These cross-type compensation positioning may increase complexity and uncertainty of the servo system.

To eliminate the downside of cross-type compensation positioning, another multiaxis machining device of the present invention is proposed. The multiaxis machining device includes a reference positioning base, a translation platform support, a first slider module, a second slider module, and a third three-dimensional displacement sensor. The reference positioning base may be made of low thermal expansion material. The translation platform support may be disposed beneath the reference positioning base. The translation platform support may include a support body, an x-axis slide shaft, a y-axis slide shaft, and a z-axis slide shaft. There may be a connection between the x-axis slide shaft and the y-axis slide shaft. The x-axis slide shaft may slide along the y-axis slide shaft; the y-axis slide shaft and the z-axis slide shaft are confined in and/or fixed to the support body. A bright spot ruler made of low thermal expansion material may be arranged on one side of the z-axis slide shaft. The first slider module may include a first slider, the z-axis micro-displacement platform, a first jig tool, a first link, and a first three-dimensional displacement sensor. There is a connection between the first slider and the x-axis slide shaft. The first slider may slide along the x-axis slide shaft. The z-axis micro-displacement platform may be disposed on the first slider. The first jig tool may be disposed on the z-axis micro-displacement platform. The first link may be disposed on a side of the first jig tool. The first three-dimensional displacement sensor, which may be fixed to the first link, may be configured to measure the reference positioning base. The second slider module includes a second slider, the x-axis micro-displacement platform, the y-axis micro-displacement platform, a second jig tool, a second link, and a second three-dimensional displacement sensor. There may be a connection between the second slider and the z-axis slide shaft. The second slider may slide along the z-axis slide shaft. The x-axis micro-displacement platform may be disposed on the second slider. There may be a connection between the y-axis micro-displacement platform and the x-axis micro-displacement platform. The second jig tool may be disposed on the y-axis micro-displacement platform. The second link may be disposed on a side of the second jig tool. The second three-dimensional displacement sensor, which may be fixed to the second link, may be configured to measure the bright spot ruler. The third three-dimensional displacement sensor, which may be fixed to the bright spot ruler, may be configured to measure the reference positioning base. Each of the first three-dimensional displacement sensor, the second three-dimensional displacement sensor, and the third three-dimensional displacement sensor may be implemented as the aforementioned three-dimensional displacement sensor respectively.

In the multiaxis machining device of the present invention, the multiaxis machining device further includes a driving and compensation system to electrically drive the x-axis slide shaft, the y-axis slide shaft, the z-axis slide shaft, the x-axis micro-displacement platform, the y-axis micro-displacement platform and the z-axis micro-displacement platform.

Accordingly, the multiaxis machining device 30 in the second example of the present invention is proposed. The z-axis micro-displacement platform 332 is disposed between the object unit slider (for instance, the first slider 231) and the object unit holder 251 (also referred to as the first jig tool) so as to compensate and correct the deformation amount $(dz)_{the\ first\ jig\ tool}$ of the first jig tool in real-time in the z-axis direction. The x-axis-versus-y-axis micro-displacement platform, which includes the x-axis micro-displacement platform 3421 and the y-axis micro-displacement platform 3422, is disposed between the second slider (for instance, the tool unit slider or the second slider 232) and the tool unit holder 252 (also referred to as the second jig tool) so as to compensate and correct the deformation amount $(dz)_{the\ second\ jig\ tool}$ of the second jig tool in the x-axis direction and the y-axis direction in real-time. Using the x-axis micro-displacement platform 3421, the y-axis micro-displacement platform 3422, and the z-axis micro-displacement platform 332 to separately compensate the total deformation (amount) of the machine body and the translation platform (for instance, the x-axis slide shaft 223, the y-axis slide shaft 222, and the z-axis slide shaft 224) generated due to thermal deformation, stress deformation, abrasion and other physics phenomenon, the machining servo system may rarely be interfered. By feeding the displacement $(dx, dy)_{the\ first\ jig\ tool}$ of the first jig tool back into an x-axis-versus-y-axis servo system (for example, an x-axis servo system and a y-axis servo system), and feeding the displacement $(dz)_{the\ second\ jig\ tool}$ of the second jig tool back into a z-axis servo system, a conventional machining servo control may be performed for multiaxis machining servo control system, which eliminates various deformation effects, without further adjustments to the servo control system.

The actual displacement of the first jig tool in the x-axis and y-axis directions may be absolute positioning with respect to the three-dimensional granite reference positioning base (for instance, the reference positioning base 210) at the top of the multiaxis machining device 30. The deformation (amount) of the first jig tool in the z-axis direction may be compensated by the z-axis micro-displacement platform 332 in real-time. The actual displacement of the second jig tool in the z-axis direction may be absolute positioning with respect to the bright spot ruler 225 and the three-dimensional granite reference positioning base at the top of the multiaxis machining device 30. The deformation (amount) of the second jig tool in the x-axis and y-axis directions may be compensated by the x-axis micro-displacement platform 3421 in real-time. In this manner, all the deformation (including thermal deformation, stress deformation, and abrasion deformation) of the first jig tool can be accurately measured and corrected. Likewise, all the deformation (including thermal deformation, stress deformation, and abrasion deformation) of the second jig tool can be accurately measured and corrected. The multiaxis machining device 30 proposed in the second example of the present invention is able to eliminate various deformation effects effectively.

Furthermore, the first link unit of the present invention is mounted on the side of the first jig tool. The first (planar) three-dimensional displacement sensor, which is disposed on the first slider, is moved to the first link unit. The first (planar) three-dimensional displacement sensor is configured to measure the three-dimensional displacement $(dx, dy, dz)_{the\ first\ jig\ tool}$ with respect to the (granite slab) reference positioning base in real-time. The first link unit may be made of low thermal expansion materials, such as constant steel, zero-expansion ceramics, and so on. Besides, the first link unit is required to have sufficient rigidity. As long as the temperature of the first link unit is properly controlled during operation, the deformation (amount) of the first link unit may be much lower than system positioning accuracy. As a result, the first jig tool may be accurately positioning with respect to the (granite slab) reference positioning base.

The second link unit is mounted on the side of the second jig tool. The second (planar) three-dimensional displacement sensor, which is disposed on the second slider, is moved to the second link unit. The second (planar) three-dimensional displacement sensor is configured to measure the three-dimensional positioning coordinate $(dx, dy, dz)_{the\ second\ jig\ tool\ with\ respect\ to\ the\ bright\ spot\ ruler}$ of the second jig tool with respect to the bright spot ruler in real-time. The second (planar) three-dimensional displacement sensor above the bright spot ruler measure three-dimensional displacement $(dx', dy', dz')_{the\ bright\ spot\ ruler\ with\ respect\ to\ the\ reference\ positioning\ base}$ of the bright spot ruler with respect to the reference positioning base in real-time. By calculating the three-dimensional displacement $(dx+dx', dy+dy', dz+dz')_{the\ second\ jig\ tool\ with\ respect\ to\ the\ reference\ positioning\ base}$ a three-dimensional displacement $(dx+dx', dy+dy', dz+dz')_{the\ second\ jig\ tool}$ of the second jig tool with respect to the reference positioning base may be obtained. The second link unit may be made of low thermal expansion materials, such as constant steel, zero-expansion ceramics, and so on. Besides, the second link unit is required to have sufficient rigidity. As long as the temperature of the second link unit is properly controlled during operation, the deformation (amount) of the second link unit may be much lower than system positioning accuracy. As a result, the second jig tool may be accurately positioning with respect to the bright spot ruler. Likewise, the bright spot ruler may be made of low thermal expansion materials, such as constant steel, zero-expansion ceramics, and so on. Besides, the bright spot ruler is required to have sufficient rigidity. As long as the temperature of the bright spot ruler is properly controlled during operation, the deformation (amount) of the bright spot ruler may be much lower than system positioning accuracy. As a result, the second jig tool may be accurately positioning with respect to the (granite slab) reference positioning base.

The z-axis micro-displacement platform is disposed between the first slider and the first jig tool so as to compensate and correct the deformation amount $(dz)_{the\ first\ jig\ tool}$ of the first jig tool in real-time. The x-axis-versus-y-axis micro-displacement platform, which includes the x-axis micro-displacement platform and the y-axis micro-displacement platform, is disposed between the second slider and the second jig tool so as to compensate and correct the deformation amount $(dx, dy)_{the\ second\ jig\ tool}$ of the second jig tool in real-time. Using x-axis micro-displacement platform, the y-axis micro-displacement platform, and the z-axis micro-displacement platform to separately compensate the deformation (amount) of the machine body and the translation platform, the machining servo system may rarely be interfered. By feeding the displacement $(dx, dy)_{the\ first\ jig\ tool}$ back into an x-axis-versus-y-axis machining servo system, and feeding the displacement $(dz)_{the\ second\ jig\ tool}$ back into a z-axis machining servo system, a conventional machining servo control may be performed. The present invention combines the aforementioned three-dimensional displacement platform architecture with three-dimensional micro-displacement platforms for multiaxis machining servo control system, which eliminates various deformation effects, without further adjustments to the machining servo control system.

In the aforementioned embodiments, to reduce friction deformation effects between the reference positioning base and the translation platform support as much as possible, the translation platform may provide multi points (at least three points) to hold up the reference positioning base. Moreover, the translation platform may be assembled or fixed between the reference positioning base and the translation platform support by single point.

The machining performance of a machine tool has dynamic accuracy and machining performance repeatability attributes. The machining performance repeatability means that the machining quality of the first workpiece is consistent with the machining quality of the last one. Machining conditions (for example, machine temperature distribution, thermal deformation, stress deformation, abrasion, and so on) or working environment (for example, ambient temperature, cooling conditions, humidity changes, and so on) of the first workpiece may however dramatically differ from those of the last workpiece. Regardless of the number of workpieces and the machining time, the machining quality must be maintained from the first workpiece to the last workpiece to ensure the machining performance repeatability. The present invention thus provides a multiaxis machining device able to eliminate various deformation effects effectively. Chances are that the positioning accuracy of hybrid machining devices, turning-milling machining devices, and multiaxis machining device may approach 1 micrometer through 5 micrometers according to the present invention.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature of the invention may have been disclosed with respect to only one of several implementations, such feature may be combined with one or more other features of the other implementations as may be desired and advantageous for any given or particular application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three-dimensional displacement sensor, comprising:
   a secure element, wherein the secure element is a hollowed shell and has a first outer wall, a second outer wall, a third outer wall, a fourth outer wall, and a fifth outer wall, wherein each of the first outer wall, the second outer wall, the third outer wall, the fourth outer wall and the fifth outer wall has a hole, wherein the first outer wall and the third outer wall face an x-axis of the secure element, wherein the second outer wall and the fourth outer wall face a y-axis of the secure element, wherein the fifth outer wall faces a z-axis of the secure element;
   a first displacement sensing component, comprising a first coherent light source and a first light source sensor arranged in pairs on the first outer wall and the third outer wall;
   a second displacement sensing component, comprising a second coherent light source and a second light source sensor arranged in pairs on the second outer wall and the fourth outer wall; and
   a third displacement sensing component, wherein the third displacement sensing component is a laser confocal displacement sensor, a color confocal displacement sensor, a white light interference displacement sensor, or a triangulation laser displacement sensor, wherein the third displacement sensing component is disposed on the fifth outer wall.

2. The three-dimensional displacement sensor according to claim 1, wherein the first coherent light source and the first light source sensor measure the object under test through the hole of the first outer wall and the hole of the third outer wall respectively, wherein the second coherent light source and the second light source sensor measure the object under test through the hole of the second outer wall and the hole of the fourth outer wall respectively, wherein the third displacement sensing component measures the object under test through the hole of the fifth outer wall.

3. The three-dimensional displacement sensor according to claim 2, wherein the first displacement sensing component, the second displacement sensing component, and the third displacement sensing component measure a same surface of the object under test.

4. A multiaxis machining device, comprising:
   a reference positioning base, made of low thermal expansion material;
   a translation platform support, disposed beneath the reference positioning base, wherein the translation platform support comprises a support body, an x-axis slide shaft, a y-axis slide shaft, and a z-axis slide shaft, wherein the x-axis slide shaft is coupled to the y-axis slide shaft, wherein the x-axis slide shaft is slidable along the y-axis slide shaft, wherein the y-axis slide shaft and the z-axis slide shaft are confined in the support body, wherein a bright spot ruler made of low thermal expansion material is arranged on one side of the z-axis slide shaft;
   a first slider module, comprising a first slider, wherein the first slider is coupled to the x-axis slide shaft, wherein the first slider is slidable along the x-axis slide shaft;
   a second slider module, comprising a second slider, wherein the second slider is coupled to the z-axis slide shaft, wherein the second slider is slidable along the z-axis slide shaft;
   a first three-dimensional displacement sensor, fixed to the first slider module;
   a second three-dimensional displacement sensor, fixed to the second slider module; and
   a third three-dimensional displacement sensor, fixed to the bright spot ruler.

5. The multiaxis machining device according to claim 4, wherein the first three-dimensional displacement sensor, the second three-dimensional displacement sensor, or the third three-dimensional displacement sensor comprises:
   a secure element, wherein the secure element is a hollowed shell and has a first outer wall, a second outer wall, a third outer wall, a fourth outer wall, and a fifth outer wall, wherein each of the first outer wall, the second outer wall, the third outer wall, the fourth outer wall and the fifth outer wall has a hole, wherein the first outer wall and the third outer wall face an x-axis of the secure element, wherein the second outer wall and the fourth outer wall face a y-axis of the secure element, wherein the fifth outer wall faces a z-axis of the secure element;
   a first displacement sensing component, comprising a first coherent light source and a first light source sensor arranged in pairs on the first outer wall and the third outer wall;

a second displacement sensing component, comprising a second coherent light source and a second light source sensor arranged in pairs on the second outer wall and the fourth outer wall; and a third displacement sensing component, wherein the third displacement sensing component is a laser confocal displacement sensor, a color confocal displacement sensor, a white light interference displacement sensor, or a triangulation laser displacement sensor, wherein the third displacement sensing component is disposed on the fifth outer wall.

6. The multiaxis machining device according to claim 4, wherein the first three-dimensional displacement sensor is fixed to the first slider of the first slider module, wherein the second three-dimensional displacement sensor is fixed to the second slider of the second slider module.

7. The multiaxis machining device according to claim 4, wherein the first slider module further comprises a z-axis micro-displacement platform and a first jig tool, wherein the z-axis micro-displacement platform is disposed on the first slider, wherein the first jig tool is disposed on the z-axis micro-displacement platform; wherein the first slider module further comprises an x-axis-versus-y-axis micro-displacement platform and a second jig tool, wherein the x-axis-versus-y-axis micro-displacement platform is disposed on the second slider, wherein the second jig tool is disposed on the x-axis-versus-y-axis micro-displacement platform.

8. The multiaxis machining device according to claim 7, wherein the first three-dimensional displacement sensor is fixed to the first jig tool of the first slider module, wherein the second three-dimensional displacement sensor is fixed to the second jig tool of the second slider module.

9. The multiaxis machining device according to claim 7, wherein the first slider module further comprises a first link unit, wherein one end of the first link unit is coupled to the first jig tool, wherein another end of the first link unit is coupled to the first three-dimensional displacement sensor, such that the first three-dimensional displacement sensor is configured to measure the reference positioning base, wherein the second slider module further comprises a second link unit, wherein one end of the second link unit is coupled to the second jig tool, wherein another end of the second link unit is coupled to the second three-dimensional displacement sensor, such that the second three-dimensional displacement sensor is configured to measure the bright spot ruler.

10. The multiaxis machining device according to claim 7, wherein the x-axis-versus-y-axis micro-displacement platform comprises a x-axis micro-displacement platform and a y-axis micro-displacement platform, wherein the x-axis micro-displacement platform is disposed on the second slider, wherein the y-axis micro-displacement platform is disposed on the x-axis micro-displacement platform, wherein the second jig tool is disposed on the y-axis micro-displacement platform.

11. The multiaxis machining device according to claim 4, further comprising:

a driving system, configured to electrically drive the x-axis slide shaft, the first slider, the second slider, the z-axis micro-displacement platform and the x-axis-versus-y-axis micro-displacement platform.

12. The multiaxis machining device according to claim 4, wherein the low thermal expansion material is granite, constant steel, or zero expansion ceramic.

13. A multiaxis machining compensation method, comprising steps of:

providing a multiaxis machining device, wherein the multiaxis machining device comprises:

a reference positioning base, made of low thermal expansion material;

a translation platform support, disposed beneath the reference positioning base, wherein the translation platform support comprises a support body, an x-axis slide shaft, a y-axis slide shaft, and a z-axis slide shaft, wherein the x-axis slide shaft is coupled to the y-axis slide shaft, wherein the x-axis slide shaft is slidable along the y-axis slide shaft, wherein the y-axis slide shaft and the z-axis slide shaft are confined in the support body, wherein a bright spot ruler made of low thermal expansion material is arranged on one side of the z-axis slide shaft;

a first slider module, comprising a first slider, wherein the first slider is coupled to the x-axis slide shaft, wherein the first slider is slidable along the x-axis slide shaft;

a second slider module, comprising a second slider, wherein the second slider is coupled to the z-axis slide shaft, wherein the second slider is slidable along the z-axis slide shaft;

a first three-dimensional displacement sensor, fixed to the first slider module;

a second three-dimensional displacement sensor, fixed to the second slider module; and a third three-dimensional displacement sensor, fixed to the bright spot ruler;

fixing the first three-dimensional displacement sensor to the first slider or the first jig tool of the first slider module, measuring the reference positioning base, and obtaining x-axis displacement, y-axis displacement, and z-axis displacement of the first slider or the first jig tool with respect to the reference positioning base to serve as a first three-dimensional displacement;

fixing the second three-dimensional displacement sensor to the second slider or the second jig tool of the second slider module, measuring the bright spot ruler, and obtaining x-axis displacement, y-axis displacement, and z-axis displacement of the second slider or the second jig tool with respect to the bright spot ruler to serve as a second three-dimensional displacement;

fixing the third three-dimensional displacement sensor to the bright spot ruler, measuring the reference positioning base, and obtaining x-axis displacement, y-axis displacement, and z-axis displacement of the bright spot ruler with respect to the reference positioning base to serve as a third three-dimensional displacement;

providing a machining compensation processor to obtain a machining processing displacement and a compensation displacement; and adjusting positions of the first slider or the first jig tool and the second slider or the second jig tool and performing feedback control of the multiaxis machining device in machining and compensation according to the machining processing displacement and the compensation displacement.

14. The multiaxis machining compensation method according to claim 13, wherein the first three-dimensional displacement sensor is fixed to the first slider, wherein the x-axis displacement, the y-axis displacement, and the z-axis displacement of the first slider with respect to the reference positioning base is obtained to serve as the first three-dimensional displacement, wherein the second three-dimensional displacement sensor is fixed to the second slider, wherein the x-axis displacement, the y-axis displacement, and the z-axis displacement of the second slider with respect to the bright spot ruler is obtained to serve as the second three-dimensional displacement, wherein the machining compensation processor calculates the first three-dimensional displacement, the second three-dimensional displacement, and the third three-dimensional displacement to obtain the machining processing displacement and the compensation displacement, wherein the machining compensation processor adjusts positions of the first slider and the second slider.

15. The multiaxis machining compensation method according to claim 13, wherein the first three-dimensional displacement sensor is fixed to the first jig tool, wherein the x-axis displacement, the y-axis displacement, and the z-axis displacement of the first jig tool with respect to the reference positioning base is obtained to serve as the first three-dimensional displacement, wherein the second three-dimensional displacement sensor is fixed to the second jig tool, wherein the x-axis displacement, the y-axis displacement, and the z-axis displacement of the second jig tool with respect to the bright spot ruler is obtained to serve as the second three-dimensional displacement, wherein the machining compensation processor adjusts positions of the first jig tool and the second jig tool.

16. The multiaxis machining compensation method according to claim 13, further comprising steps of:

adding the second three-dimensional displacement and the third three-dimensional displacement to obtain a second slider relative to a fourth three-dimensional displacement of the second jig tool with respect to the reference positioning base, wherein the machining processing displacement is obtained by means of the x-axis displacement of the first three-dimensional displacement, the y-axis displacement of the first three-dimensional displacement, and the z-axis displacement of the fourth three-dimensional displacement, wherein the compensation displacement is obtained by means of the z-axis displacement of the first three-dimensional displacement, the x-axis displacement of the fourth three-dimensional displacement, and the y-axis displacement of the fourth three-dimensional displacement.

* * * * *